United States Patent [19]
Fischer et al.

[11] 3,970,554

[45] July 20, 1976

[54] PROCESS FOR DETOXIFICATION OF CYANIDES AND NITRILES WITH PEROXYGEN COMPOUNDS

[75] Inventors: Joachim Fischer, Grossauheim;
Helmut Knorre, Seligenstadt;
Gerhard Pohl, Grossauheim, all of Germany

[73] Assignee: Deutsche Gold- und Silber-Scheideanstalt vormals Roessler, Germany

[22] Filed: Oct. 16, 1974

[21] Appl. No.: 515,253

[30] Foreign Application Priority Data
Oct. 22, 1973  Germany............................ 2352856

[52] U.S. Cl. ................................. 210/62; 210/63 R
[51] Int. Cl.² ........................................... C02B 1/36
[58] Field of Search .................. 210/62, 63, 59, 50; 423/500, 502; 252/441, 416

[56] References Cited
UNITED STATES PATENTS

| | | | |
|---|---|---|---|
| 2,105,835 | 1/1938 | Krause | 210/63 |
| 3,510,424 | 5/1970 | Zumbrunn | 210/63 |
| 3,617,567 | 11/1971 | Mathre | 210/50 |
| 3,772,194 | 11/1973 | Baden | 210/62 |
| 3,835,047 | 9/1974 | Colin | 210/63 |

OTHER PUBLICATIONS

Cotton et al., "Advanced Inorganic Chemistry" Interscience Publishers 2nd, Edition (1966), pp. 373-374.

Surfleet et al., "Solvation and Salt Effects in the Reaction of Hydrogen Peroxide With Iodide Ion at High Iodide Concentrations" J. Chem. Soc. A 1967 (10), 1564-1566.

*Primary Examiner*—Charles N. Hart
*Assistant Examiner*—Benoit Castel
*Attorney, Agent, or Firm*—Cushman, Darby & Cushman

[57] ABSTRACT

Waste water containing cyanides, cyanohydrins and/or organic nitriles are detoxified by adding a peroxide compound in the presence of iodide ion or free iodine, in a given case in the presence of silver ions.

15 Claims, No Drawings

PROCESS FOR DETOXIFICATION OF CYANIDES AND NITRILES WITH PEROXYGEN COMPOUNDS

The invention is directed to a process for detoxification of solutions and waste waters which contain inorganic cyanides and/or organic nitriles. The $CN^-$ ion thereby is preferably primarily oxidized to $OCN^-$ ion and in subsequent reactions changed into nitrogen, ammonia, carbon dioxide and carbonate.

The detoxification of cyanide containing waste water is now as ever one of the most important requirements in the protection of the environment. There have not lacked therefore proposed processes for solving this problem. One of the best known processes for the destruction of dissolved cyanides depends on the action of hypochlorite. Hereby the dissolved cyanide as is known first is converted into cyanogen chloride gas, $$CN^- + OCl^- + H_2O \rightarrow ClCN + 2\ OH^-$$

which is practically just as toxic a compound as hydrocyanic acid and therefore in the subsequent reaction must be converted into cyanate:

$$ClCN + 2\ OH^- \rightarrow OCN^- + Cl^- + H_2O$$

The hydrolysis reaction, however, only proceeds at high pH values with so great a speed that the intermediarily formed cyanogen chloride gas which is only soluble to a limited extent is not set free.

This pH requirement, however, then becomes a source of danger if there is used chlorine gas for the detoxification in place of using hypochlorite solution (bleaching liquor) and the pH value must be continuously regulated with lye.

Also at too high cyanide concentrations and temperatures above 38°C. there is the danger of setting free of toxic cyanogen chloride. Besides the process has the disadvantage that a strong salting of the waste water occurs both by the hypochlorite ($Cl_2 + 2\ NaOH \rightarrow NaOCl + NaCl + H_2O$) and by the high pH value of the solution to be detoxified in the back neutralization.

Furthermore, it has been shown that in the presence of organic compounds in the hypochlorite detoxification frequently chlorination products are formed which are not broken down in the normal manner in biological purification plants and therethrough can arrive at free waters where they are strongly toxic to fish and other lower forms of life. Also, an excess of hypochlorite for the most part is just as disadvantageous as the cyanide which should be destroyed by this reaction.

Therefore, there are frequently used automatically regulated detoxification plants which should stop the addition of hypochlorite as soon as the cyanide is destroyed without residue. The indication of this end point takes place for the most part with help of noble metal electrodes, which to be sure, indicate that the cyanide present is converted without residue into cyanogen chloride; however, as explained above, this still does not guarantee that there has taken place a residue free hydrolysis of the toxic cyanogen chloride into non-toxic subsequent products. Besides the potentiometric indication and regulation of the reaction is often disturbed by organic impurities whereby either the cyanide is not detoxified without residue or an excess of hypochlorite goes into the waste water.

Therefore, for a long time there have been endeavors to replace the hypochlorite by problem-free chemicals for the cyanide detoxification. An ideal oxidation agent is hydrogen peroxide because it converts the cyanide directly into cyanate without formation of toxic intermediates, $$CN^- + H_2O_2 \rightarrow OCN^- + H_2O$$

which is quickly hydrolyzed in the subsequent reaction into carbonate and ammonia:

$$OCN^- + H_2O + OH^- \rightarrow CO_{3=} + NH_3.$$

In this reaction neither the cyanide concentration nor the temperature of the solution to be detoxified must be limited; also it is not required to use as high a pH value as in the hypochlorite process. This means that an additional salting of the waste water cannot be effected by either the oxidation agent itself, $H_2O_2$, or the pH value.

In spite of these advantages the process can scarcely find admittance in practice since the reaction of the $H_2O_2$ with the cyanide requires the addition of a catalytically acting copper salt. This catalyst, however, has the disadvantage that it on the one hand also strongly catalyzes the decomposition of the $H_2O_2$ just when the last amount of cyanide is to be destroyed and therefore often there is not produced a sufficient degree of detoxification.

On the other hand, it forms in the course of the reaction from the starting copper tetracyano complex through stepwise breakdown the difficultly soluble CuCN or, if it is completely broken down with excess $H_2O_2$, the copper tetramine complex, which prevents the precipitation of the copper as the hydroxide. Therefore, the copper can pass into the waste water and act as a toxic material toward lower forms of life. Besides, it does not permit the process to be carried on and controlled electrochemically.

Entirely similar is the situation in the process described in German Offenlegungschrift 1,901,038 wherein there are added peroxy acids in place of $H_2O_2$ to change the cyanide to cyanate. This reaction also must be catalyzed with copper ions, in order that it takes place with sufficient speed. As in the $H_2O_2$ process, however, the copper also acts here in the end phase as a decomposition catalyst for the peroxy acids, so that frequently the desired degree of detoxification cannot be produced. Besides it likewise builds copper tetramine complexes which prevent the quantitative precipitation of copper.

According to German Offenlegungschrift 2,109,939, there has further been made known a process that describes the detoxification of cyanidic solutions by reaction with formaldehyde and hydrogen peroxide. In the first step the glyconitrile is formed from the cyanide, which is saponified by the action of $H_2O_2$ into glycolic acid amide and glycolic acid.

To be sure the process requires no catalysts but it has the disadvantage that it requires the exact dosage of two reactants, that it is not able to be carried on and controlled electrochemically and the biological oxygen demand (BOD) in the waste water is strongly increased by the reaction products.

The object of the invention is the development of a process in which the cyanide can be converted into non-toxic compounds on an industrial scale without forming toxic intermediate products and which is as easy as possible to control electrochemically. Furthermore, no salting of the waste water should take place and an excess of the added reagents should not be harmful.

There has now been found that cyanide can be converted to non-toxic compounds with hydrogen peroxide in an easily regulated manner without formation of toxic intermediate products if the oxidation is carried out in the presence of iodide ions and/or free iodine, in a given case in the presence of silver ions.

Through these additions not only is the reaction considerably accelerated but it is also possible to follow and regulate the reaction potentiometrically, namely, with the help of a silver electrode and a calomel or thalamide electrode as reference electrode. The end of the detoxification reaction is indicated by a clear potential jump over several hundred millivolts which also can be used as the signal for the regulation of the $H_2O_2$ addition.

An advantage of the catalyst system of the invention further consists in that it does not catalyze the decomposition of the hydrogen peroxide and that it can be separated from the solution at the end of the reaction without having to do anything further as the difficultly soluble compound AgI.

Therefore, it can be easily separated and reworked. Only with the separation of the catalyst from the solution does there also automatically take place the breakdown of an eventually still present excess of hydrogen peroxide.

Hydrogen peroxide is added as such, i.e., in commercial solutions of 10–70 weight %. However, there can also be used diluted solutions down to 5 weight %. Preferably there are used solutions of 30 to 50 weight %.

In place of free hydrogen peroxide there can also be added compounds which develop hydrogen peroxide under the reaction conditions, such as alkali or alkaline earth peroxides, e.g., sodium peroxide, potassium peroxide, organic or inorganic addition compounds of hydrogen peroxide such as urea peroxides.

Furthermore, there have also proven effective compounds which develop active oxygen. Among these are perborates, percarbonates and persulfates, e.g., sodium perborate, potassium perborate, sodium percarbonate, sodium persulfate, potassium persulfate and peralkanoic acids such as peracetic acid.

For carrying out the detoxification reaction one proceeds suitably in the following manner.

There is first added to the cyanidic solution a corresponding amount of the aqueous solution of a silver salt, for example $AgNO_3$ and then the necessary amount of an alkali iodide, e.g., sodium iodide or potassium iodide, or iodine in a solution of alkali iodide, e.g., sodium or potassium iodide. According to the cyanide content there is either added the calculated amount of hydrogen peroxide at once and the end of the reaction observed based on the course of the potential of a silver-reference electrode pair or there is continuously dosed the hydrogen peroxide until the electrode system shows the complete detoxification of the solution. The first form of addition is recommended primarily at low cyanide concentrations, the continuous addition at high cyanide concentrations and to avoid a too exothermic and spontaneous running of the reaction.

In regard to the amount of silver and iodine it is generally sufficient to add to the solution to be detoxified 0.001 to 10 mg $Ag^+/m^3$ and 0.5 to 50 mg $I^-/l$ in order to bring about a smooth and quantitative detoxification to an end concentration less than 0.1 mg $CN^-/l$. Preferably there is used 0.1 to 1 mg $Ag^+/m^3$ and 5 to 15 mg $I^-/l$. (As silver compounds there can be used for example $AgNO_3$, $Ag_2SO_4$ and AgI and as iodine or iodine compounds, $I_2$, KI, $KI_3$, $KIO_3$, AgI, NaI). Best suited for the purpose of the invention are an aqueous silver nitrate solution containing 0.1 gram $Ag^+/l$ and an aqueous potassium iodide solution containing 100 grams $I^-/l$. In place of this, however, there can also be used an aqueous solution of potassium or sodium iodide containing 100 grams $I_3^-/l$. The exact concentration of the silver ions and the iodine or iodide ions in the solutions added to the cyanide containing waters is not critical and can be varied widely. Preferably, there is added to the cyanide solution to be detoxified the iodide and silver in the ratio of 5 mg KI to 1 gamma $Ag^+/l$.

Since the operation is preferably carried out with an excess of iodide over silver, the silver is quantitatively separated from the solution as difficultly soluble silver iodide after the detoxification reaction and can be recovered, reprocessed and again added. The course of the reactions is as follows:

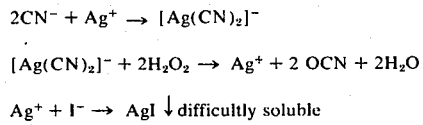

In the direct reuse of the separated silver iodide as catalyst and activator this is dissolved again with formation of the silver cyanide complex.

Through the catalyst system according to the invention besides there is clearly accelerated the oxidative breakdown of organic compounds, preferably sulfur containing compounds, with active oxygen compounds and also the subsequent biological breakdown of the oxidation products.

Excess iodine does not disturb the subsequent biological clarification of the waste waters, but catalyzes the breakdown. Therefore, the amount of excess iodide is not critical but is limited in a practical sense only by economical reasons.

The theoretically required amount of active oxygen is 1 mole of active oxygen per mole of $CN^-$. According to the concentration, type of cyanide or nitrile and the temperature of the solution to be detoxified, there are added in practice about 70 to 200 weight % of the theoretically necessary amount of active oxygen, in order to produce a quantitative detoxification in an economically sound time. These amounts are ascertained by a small scale test.

Less than 100 weight % of theory are needed if high cyanide concentrations are present and on account of the detoxification reaction the reaction temperature is increased to such an extent that simultaneously there also takes place a hydrolysis of the cyanide to formate and ammonia

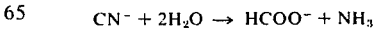

or the nitriles to the corresponding carboxylic acids or their salts

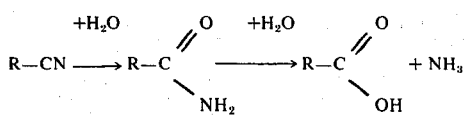

It is necessary to work with an excess of active oxygen if less CN⁻ concentration is present and there is no possibility of heating the reaction mixture. Generally an excess of 5-20 weight % of theory is sufficient in order to provide an adequate speed of reaction and detoxification. If other oxidizable materials are contained in the solution in addition to cyanides and nitriles there results by necessity greater consumption of active oxygen because simultaneously this breakdown is made possible by the catalyst system. In an advantageous manner thereby the COD (Chemical Oxygen Demand) or BOD (Biological Oxygen Demand) of the solution is greatly reduced. The amount of $H_2O_2$ can be added as such at one time or in several partial amounts.

The speed of the detoxification reaction depends on the starting cyanide concentration, also on the amount of catalyst added, the excess of hydrogen peroxide, the pH value of the solution and the starting temperature. As the pH range there can be used values between 6 and 12. Especially suited is a pH value of about 10-10.5.

In open detoxification plants, however, one should not operate under a pH of 9 in order to safely exclude the setting free of hydrocyanic acid. Since, because of the catalytic oxidation organic compounds, even organic acids, can form in the detoxification, there must be considered the connected reduction in pH value and this corrected if necessary by addition of lye. In closed plants the detoxification can also be carried out at pH values between 6 and 9.

Generally, this detoxification reaction is accelerated by the increase of the temperature of the solution to be detoxified. A preheating of the solution, however, is only necessary if lower CN⁻ concentrations are present. Generally, temperatures of 10° to 80°C. are used. Preferably, the temperature is about 50°C. since hereby a slight excess of active oxygen compound is necessary.

In order to follow the course of the reaction of the cyanide detoxification, potentiometrically there is immersed in the solution to be detoxified a noble metal electrode as, for example Ag or Au, preferably a silver electrode and a reference electrode, as for example a thalamide or calomel electrode and it is connected to a potentiometer or a potentiograph. In place of the noble metal electrode for indication of the reaction there can also be inserted under certain provisions cyanide or silver sensitive electrodes. At the beginning of the reaction there is established a potential value of approximately +130 mV using an Ag/Thalamide-electrode pair in an alkali cyanide solution according to the concentration, impurities and pH value. After addition of the active oxygen compound, preferably hydrogen peroxide, and establishment of the detoxification reaction there first occurs only a small displacement of the potential value toward positive values. However, as soon as with advancing detoxification, an intermediate potential of about +500 mV has set in there takes place in the endpoint of the reaction a potential jump of about 200 to 360 mV to about +700 to +860 mV.

This potential jump on the one hand can be used to signal the end of the detoxification reaction or in continuous addition of the oxidizing agent to disconnecting the dosaging.

The end of the detoxification using the catalyst system of the invention is also shown by the formation of a yellow turbidity on account of the separation of difficulty soluble silver iodide as well as through the subsequent decomposition of the excess oxidation agent used, preferably hydrogen peroxide, with the development of oxygen.

The process of the invention is primarily used on inorganic cyanides which are completely or substantially dissociated into metal ions and cyanide ions in aqueous solution under the conditions of the reaction. Additionally, the invention is useful with organic cyanohydrins or unsubstituted nitriles. Thus, the invention can be used with alkali cyanides such as sodium cyanide and potassium cyanide, cadmium cyanide, copper cyanide and zinc cyanide, cyanohydrins such as acetone cyanohydrin, formaldehyde cyanohydrin, acetaldehyde cyanohydrin, benzaldehyde cyanohydrin, methyl ethyl ketone cyanohydrin and cyclohexanone cyanohydrin, unsubstituted nitriles such as acetonitrile, propionitrile, butyronitrile, isobutyronitrile, acrylonitrile, methacrylonitrile, benzonitrile, phenylacetonitrile, p-toluonitrile, o-toluonitrile, malononitrile and glutaronitrile.

To be sure, according to German Offenlegungsschrift 2,109,939 and corresponding Lawes U.S. Pat. No. 3,617,582 at certain intervals waste water samples were taken and the cyanide concentration determined by titration with silver nitrate and the concentration of hydrogen peroxide determined by standard iodometric methods using sodium thiosulfate, note in particular examples 1 to 8 of Lawes and the corresponding German Offenlegungsschrift. This work was only for analytical purposes and the analytical procedures had no direct effect on the reactions occurring in the waste water being detoxified. It was, therefore, not obvious that it would be possible to influence directly an entirely different detoxification process, namely the conversion of cyanide with hydrogen peroxide into cyanate or carbonate and ammonium compounds by addition of iodine and silver to cyanide containing effluents namely in such a way that this process thereby for the first time can be carried out in a simple manner on an industrial scale.

Unless otherwise indicated, all parts and percentages are by weight.

EXAMPLE 1:

In an aqueous solution containing 12.5 grams of NaCN in 4 liters of $H_2O$ after adjustment of the pH with soda lye to 11 and heating to 50°C. with stirring there were added 35 ml of a commercially available 30% aqueous $H_2O_2$ and amounts of KI/l from o to 20 mg KI in the form of a 0.4% aqueous KI solution. The running of the reaction was followed potentiographically by an Ag/Thalamide electrode pair and after indication of the end point of the detoxification results, the residual cyanide content determined by colorometrical determination. The results of the series of tests are summarized in Table I.

TABLE I

| Test No. | mg KI-addition per liter of Cyanide Solution To be Detoxified | Reaction Time In Minutes | Potential mV Beginning | Value End | Detoxification Results mg CN$^-$/l |
| --- | --- | --- | --- | --- | --- |
| 1 | 0.0 | 107 | +815 | +900 | <0.1 |
| 2 | 1.0 | 69 | +240 | +860 | <0.1 |
| 3 | 2.5 | 65 | +240 | +810 | <0.1 |
| 4 | 5.0 | 65 | +240 | +760 | <0.1 |
| 5 | 5.0 | 65 | +300 | +770 | <0.1 |
| 6 | 10.0 | 65 | +215 | +735 | <0.1 |
| 7 | 20.0 | 53 | +200 | +710 | <0.1 |

All reactions lead to a complete detoxification. The reaction without KI-addition, however, required almost double as long a reaction time as test 7. Besides there occurred only a small continuous potential change, but no potential jump upwardy, as appeared in tests 2 to 7.

Also a color change of the reaction solution at the end of the detoxification reaction was absent in test 1 but was present in tests 2 to 7.

EXAMPLE 2:

To an aqueous solution such as that employed in Example 1 there was added the same amount of the 30% H$_2$O$_2$ and in place of the KI there was added an aqueous solution with 1 gamma or 1 mg Ag$^+$/ml and a combination of KI and Ag$^+$ in concentrations of 1 gamma Ag$^+$/l of the solution to be detoxified and 5 mg KI/l of the solution to be detoxified. The results of these tests are collected in Table 2.

TABLE 2

| Test No. | mg KI-addition per liter of Cyanide Solution to be detoxified | gamma Ag$^+$ added per liter of solution to be detoxified | Reaction Time In Minutes | Potential mV Beginning | Value End | Detoxification results mg CN$^-$/l |
| --- | --- | --- | --- | --- | --- | --- |
| 8 | — | 1 | 74 | +840 | +880 | <0.1 |
| 9 | — | 1,000 | 70 | +830 | +890 | <0.1 |
| 10 | 5 | 1 | 50 | +120 | +760 | <0.1 |

Again in all cases there was produced a complete detoxification below 0.1 mg CN$^-$/l. The Ag$^+$ addition likewise effected an acceleration of the reaction (compare test 1), however, it did not make possible a clear indication of the progress of the reaction and the end point by potentiometric measurement.

In test 10 on the contrary, both the reaction was accelerated (compare tests 4, 5 and 10), and there was produced an unobjectionable potential pattern and a clear potential jump.

EXAMPLE 3:

To an aqueous solution containing 12.5 grams of NaCN in 4 liters of water after adjustment of the pH with soda lye to 11 and heating to 50°C. with stirring and addition of 5 mg KI/l as well as 1 gamma Ag$^+$/l there were added with stirring amounts of a 30% commercially available aqueous H$_2$O$_2$ solution corresponding to 110 to 150% of theory based on the cyanide employed. The progress of the reaction was again followed potentiographically by an Ag/thalamide electrode pair and after reaching the end point the detoxification results checked by colorimetric determination of the residual cyanide content. The conditions and results of this series of tests are collected in Table 3.

TABLE 3

| Test No. | Mol-% H$_2$O$_2$ CN$^-$ | Reaction Time In Minutes | Potential mV Beginning | Value End | Detoxification Results mg CN$^-$/l |
| --- | --- | --- | --- | --- | --- |
| 11 | 110 | 77 | +100 | +730 | <0.1 |
| (10) | 120 | 50 | +120 | +760 | <0.1 |
| 12 | 130 | 52 | +130 | +730 | <0.1 |
| 13 | 140 | 44 | +160 | +760 | <0.1 |
| 14 | 150 | 41 | +160 | +760 | <0.1 |

According to the potentiometrically indicated potential jump the cyanide was destroyed in all tests to below 0.1 mg CN$^-$/l. The excess of H$_2$O$_2$ compared to cyanide, however, clearly affected the reaction time required for the detoxification. With 50% excess the detoxification only required about half as long as the 10% excess.

EXAMPLE 4:

To an aqueous solution containing 12.5 grams of NaCN in 4 liters of water after heating to 50°C. and addition of 5 mg KI/l as well as 1 gamma Ag$^+$/l the pH was adjusted between 8 and 12.5 and then there were added with stirring amounts of a 30% commercially available aqueous H$_2$O$_2$ solution corresponding to 120% of theory based on the cyanide employed. The progress of the reaction was followed potentiometrically as in the preceding examples and the detoxification results checkd by determination of the residual cyanide content. The conditions and results of this series of tests are summarized in Table 4.

TABLE 4

| Test No. | pH of the Solution Beginning | End | Reaction Time In Minutes | Potential mV Beginning | Value End | Detoxification Results mg CN$^-$/l |
| --- | --- | --- | --- | --- | --- | --- |
| 15 | 8 | 7.85 | 87 | +140 | +730 | <0.1 |

TABLE 4-continued

| Test No. | pH of the Solution Beginning | End | Reaction Time In Minutes | Potential mV Beginning | Value End | Detoxification Results mg CN⁻/l |
|---|---|---|---|---|---|---|
| 16 | 9 | 9.05 | 44 | +150 | +800 | <0.1 |
| 17 | 10 | 9.75 | 43 | +140 | +760 | <0.1 |
| (10) | 11 | 10.1 | 50 | +120 | +760 | <0.1 |
| 18 | 12 | 10.8 | 87 | +180 | +770 | <0.1 |
| 19 | 12.5 | 11.9 | >300 | ~+115 | ~+200 | >500 |

With the exception of the test at pH 12.5 the detoxification in the pH range of 8–12 always led to residual concentrations of less than 0.1 mg $CN^-$/l. In tests 15–18 again the end of the reaction is clearly recognizable through a jump in potential; in test 26 (below) the potentiometric indication failed to work because of the too slow speed of reaction. The series of tests establishes that the optimum detoxification reaction is at pH values between 9 and 11, whereby it should be borne in mind that at pH values below 10 the detoxification must be carried out in a closed system.

EXAMPLE 5:

An aqueous solution of 12.5 grams of NaCN in 4 liters of water after adjusting the pH to 11 and addition of 5 mg KI/l as well as 1 gamma $Ag^+$/l was heated to different reaction temperatures and subsequently with stirring treated with an amount of 30% aqueous $H_2O_2$ which corresponded to 120% of theory based on the cyanide added. The conditions and results of this series of tests are summarized in Table 5.

TABLE 5

| Test No. | Reaction Temperature °C. | Reaction Time Minutes | Potential mV Beginning | Value End | Detoxification Results mg CN⁻/l |
|---|---|---|---|---|---|
| 20 | 26 | 260 | +160 | +780 | <0.1 |
| 21 | 40 | 90 | +160 | +720 | <0.1 |
| (10) | 50 | 50 | +120 | +760 | <0.1 |
| 22 | 60 | 30 | +130 | +790 | <0.1 |

In all the reactions a detoxification was produced to less than 0.1 mg $CN^-$/l and the endpoint indicated by a jump in potential. With increasing temperature, there was attained a shortening of the reaction time.

EXAMPLE 6:

A solution of 21.65 grams of acetone cyanohydrin in 4 liters of water after adjustment of the pH to 11 and addition of 5 mg KI/l and 1 gamma of $Ag^+$/l was treated with stirring at different temperatures with an amount of 35 ml of 30% aqueous $H_2O_2$ and brought to reaction. The conditions and results of this series of tests are summarized in Table 6.

TABLE 6

| Test No. | Reaction Temperature °C. | KI mg/l | Ag⁺ gamma/l | Reaction Time Minutes | Potential mV Beginning | Value End | Detoxification Results mg CN⁻/l |
|---|---|---|---|---|---|---|---|
| 23 | 50 | 5 | 1 | 50 | +140 | +800 | <0.1 |
| 24 | 60 | 5 | 1 | 30 | +120 | +800 | <0.1 |

In all the reactions there was produced a detoxification up to less than 0.1 mg $CN^-$/l. In tests No. 23 and 24, the end point of the detoxification was indicated by a jump in potential.

Without addition of KI and $Ag^+$ there was no potentiometrical indication of the endpoint.

EXAMPLE 7:

To an aqueous solution of 12.5 grams of NaCN in 4 liters of water after adjusting the pH value to 11 and addition of 5 mg KI/l and 1 gamma $Ag^+$/l there were added 47 grams of sodium perborate, corresponding to 120% of theory based on the cyanide added.

The conditions and results are summarized in Table 7.

TABLE 7

| Test No. | Reaction Temperature °C | KI mg/l | Ag⁺ gamma/l | Reaction time Minutes | Potential mV Beginning | Value End | Detoxification Results mg CN⁻/l |
|---|---|---|---|---|---|---|---|
| 25 | 50 | 5 | 1 | 150 | +120 | +780 | <0.1 |
| 26 | 50 | — | — | 160 | +800 | +900 | <0.1 |

In all reactions a detoxification to less than 0.1 mg $CN^-$/l was produced. In test No. 25 the endpoint of the detoxification was indicated by a jump in potential while in test No. 26 in which no KI and $Ag^+$ were added, it was not possible to determine the endpoint of the detoxification reaction by the redox potential.

EXAMPLE 8:

Each time 1.5 liters of a waste water originating in practice from an organic synthesis of sulfur containing compounds with a content of 0.32 grams of $CN^-$/l and a COD value of about 50,000 mg $O_2$/l were detoxified with addition of different amounts of KI and $H_2O_2$ as well as under different pH conditions. The individual reaction conditions and results are summarized in Table 8.

By the use of $H_2O_2$ alone to be sure, there was a detoxification to less than 0.1 mg $CN^-$/l and there was obtained a reduction of the COD value and the fish toxicity. However, there was needed about 3 to 4 times as much oxidizing agent compared to the tests using iodine as a catalyst. Besides, the fish toxicity of the waste water was substantially lowered by the process of the invention.

After the detoxification of the cyanide with hypochlorite by comparison this waste water still had such a high fish toxicity that even at a 1000 times dilution the fish were killed within the shortest time.

TABLE 8

| Test No. | grams I per cubic meter | kg $H_2O_2$ (100%) per cubic meter | Reaction Temperature °C | pH | Reaction Time Minutes | Final Cyanide Content mg $CN^-$/l | COD After Treatment mg $O_2$/l | Toxicity Fish Living at Dilution | Fish Dead at Dilution |
|---|---|---|---|---|---|---|---|---|---|
| 27 | 0 | 27.5 | 50 | 12.5–10.9 | 64 | <0.1 | 23,700 | 1+200 | 1+100 |
| 28 | 0 | 37.5 | 50 | 5.45–5.2 | 75 | <0.1 | 49,000 | — | 1+500 |
| 29 | 10 | 22.0 | 50–60 | 13–10.6 | 60 | <0.1 | 24,000 | 1+25 | — |
| 30 | 13 | 6 | 60 | 9 | 70 | 1.5 | 33,000 | 1+50 | 1+20 |
| 31 | 13 | 8 | 65 | 9 | 60 | 1.2 | 32,500 | 1+50 | 1+20 |
| 32 | 13 | 12 | 60 | 8 | 75 | 1.1 | 31,200 | 1+50 | 1+20 |
| 33 | 13 | 10 | 30–60 | 7.7 | 90 | 0.2 | 34,000 | 1+20 | 1+10 |

What is claimed is:

1. In a process for the detoxification of waste water containing a member of the group consisting of inorganic cyanides, organic unsubstituted nitriles and organic cyanohydrins by the addition of a peroxygen compound the improvement comprising carrying out the detoxification in the presence of an iodine source selected from the group consisting of iodine, iodide ions and a mixture of iodine and iodide ions.

2. The process of claim 1 wherein silver ions are also present.

3. The process of claim 2 wherein the peroxygen compounds is hydrogen peroxide and the materials added to the waste water consist essentially of (1) an iodine source which is iodine, iodide ions or a mixture of iodine and iodide ions, (2) silver ions, (3) hydrogen peroxide.

4. The process of claim 3 wherein the iodine source is sodium iodide, sodium triiodide, potassium iodide or potassium triiodide and the silver is employed as silver nitrate or silver iodide.

5. The process of claim 2 wherein the pH is between 6 and 12 and the temperature between 10° and 80°C.

6. The processs of claim 5 wherein the pH is between 8 and 12.

7. The process of claim 6 wherein the pH is between 9 and 11.

8. The process of claim 7 wherein the pH is between 10 and 11.

9. The process of claim 5 wherein the peroxygen compound is hydrogen peroxide.

10. The process of claim 5 wherein the iodine source is used in an amount of 1 to 50 mg $I^-$ per liter of waste water to be detoxified and the silver is used in an amount of 1 to 1000 micrograms $Ag^+$ per cubic meter of waste water to be detoxified.

11. The process of claim 10 wherein the silver is used in an amount of 1 to 10 micrograms $Ag^+$ per cubic meter of waste water to be detoxified.

12. The process of claim 11 wherein the iodine source is used in an amount of 5 mg $I^-$ and the silver in an amount of 1 microgram $Ag^+$ per liter of waste water to be detoxified.

13. The process of claim 5 wherein the iodine source is sodium iodide, sodium triiodide, potassium iodide or potassium triiodide and the silver is employed as silver nitrate or silver iodide.

14. The processs of claim 13 wherein the iodine source is aqueous potassium iodide or aqueous potassium triiodide solution and the silver is employed as aqueous silver nitrate solution.

15. The process of claim 13, wherein the progress of the detoxification is measured potentiographically.

* * * * *